United States Patent
Gu et al.

(10) Patent No.: US 11,981,783 B2
(45) Date of Patent: May 14, 2024

(54) COLORLESS CLEAR FLEXIBLE POLYURETHANE WITH HIGH DIELECTRIC CONSTANT AND SELF-REPAIRING METHOD THEREOF

(71) Applicant: SOOCHOW UNIVERSITY, Suzhou (CN)

(72) Inventors: Aijuan Gu, Suzhou (CN); Guozheng Liang, Suzhou (CN); Li Yuan, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 543 days.

(21) Appl. No.: 17/398,285

(22) Filed: Aug. 10, 2021

(65) Prior Publication Data
US 2021/0363315 A1    Nov. 25, 2021

Related U.S. Application Data

(63) Continuation of application No. PCT/CN2019/075130, filed on Feb. 14, 2019.

(51) Int. Cl.
  *C08J 5/18* (2006.01)
  *C08G 18/12* (2006.01)
  (Continued)

(52) U.S. Cl.
  CPC .............. *C08J 5/18* (2013.01); *C08G 18/12* (2013.01); *C08G 18/3863* (2013.01);
  (Continued)

(58) Field of Classification Search
  CPC ......... C08G 18/3863; C08G 18/44; C08J 5/18
  See application file for complete search history.

(56) References Cited

U.S. PATENT DOCUMENTS

| | | | |
|---|---|---|---|
| 8,664,298 B1 * | 3/2014 | Ou | C08G 18/44 523/205 |
| 8,987,352 B1 * | 3/2015 | Ou | C08L 67/04 524/415 |

(Continued)

FOREIGN PATENT DOCUMENTS

| | | | |
|---|---|---|---|
| CN | 105482065 A | 4/2016 | |
| CN | 106654364 A | 5/2017 | |

(Continued)

OTHER PUBLICATIONS

Judit Canadell, Han Goossens, and Bert Klumperman. Macromolecules 2011 44 (8), 2536-2541 DOI: 10.1021/ma2001492 (Year: 2011).*

*Primary Examiner* — Michael M Dollinger
(74) *Attorney, Agent, or Firm* — SZDC Law PC

(57) ABSTRACT

A method for preparing a transparent flexible polyurethane film includes the following steps: (1) mixing a hydroxyl-terminated polyalkylene carbonate diol, a diisocyanate compound, 2,2'-dithiodiethanol, dibutyltin dilaurate and a chloroalkane solvent, and then reacting at 40 to 60° C. for 0.5 to 3 h to obtain an isocyanate-terminated oligomer solution; and (2) adding a polyol cross-linking agent, a bistrifluoromethanesulfonimide lithium salt and a 1-ethyl-3-methylimidazole bistrifluoromethanesulfonimide salt to the isocyanate-terminated oligomer solution, reacting at 40 to 60° C. for 0.5 to 1.5 h, removing the chloroalkane solvent to obtain the transparent flexible polyurethane film.

6 Claims, 8 Drawing Sheets

(51) Int. Cl.
*C08G 18/38* (2006.01)
*C08G 18/44* (2006.01)
*C08G 18/66* (2006.01)
*C08G 18/75* (2006.01)

(52) U.S. Cl.
CPC ............ *C08G 18/44* (2013.01); *C08G 18/66* (2013.01); *C08G 18/755* (2013.01); *C08J 2375/04* (2013.01)

(56) References Cited

U.S. PATENT DOCUMENTS

| | | | |
|---|---|---|---|
| 11,299,578 B2* | 4/2022 | Hwang | C08G 18/4854 |
| 11,780,951 B2* | 10/2023 | Zhang | C07C 319/22 |
| | | | 528/68 |
| 2012/0128960 A1* | 5/2012 | Busgen | F15D 1/12 |
| | | | 428/521 |
| 2016/0235650 A1* | 8/2016 | Simard | C08L 5/10 |
| 2020/0010716 A1* | 1/2020 | Yoshizawa | C08G 18/4063 |
| 2021/0363315 A1* | 11/2021 | Gu | C08G 18/755 |

FOREIGN PATENT DOCUMENTS

| | | | | |
|---|---|---|---|---|
| CN | 107974072 A | | 5/2018 | |
| CN | 108503782 A | | 9/2018 | |
| CN | 109659605 A | * | 4/2019 | ........ H01M 10/0525 |
| CN | 109776753 A | | 5/2019 | |
| CN | 111690365 A | * | 9/2020 | ............ C08G 18/10 |
| CN | 112159602 A | * | 1/2021 | ......... C08G 18/3859 |
| CN | 113363571 A | * | 9/2021 | |

* cited by examiner

Intact original shape
polyurethane film polyurethane film
after self-healable

COLORLESS CLEAR FLEXIBLE POLYURETHANE WITH HIGH DIELECTRIC CONSTANT AND SELF-REPAIRING METHOD THEREOF

This application is a Continuation Application of PCT/CN2019/075130, filed on Feb. 14, 2019, which is incorporated by reference for all purposes as if fully set forth herein.

TECHNICAL FIELD

The present invention relates to a polyurethane (polyurethane film) and preparing method thereof, and particularly relates to the transparent flexible polyurethane with high dielectric constant and self-healable method thereof.

BACKGROUND TECHNIQUE

Flexibility is the development trend of electronic devices. Electronic devices are often multilayer structures, in which glass is widely used to prepare transparent covers for electronic devices because of its outstanding mechanical properties and colorless and transparent characteristics. However, due to the high rigidity of glass, the bendability of the device is very limited. Although the bending capacity of glass can be improved by reducing the thickness, the high range is very limited, and the glass is more vulnerable to damage, which greatly hinders the development process of flexibility of electronic devices.

Facing the general trend of flexibilization of electronic devices, people use polymer materials to replace glass to obtain flexibility. However, the widely used polycarbonate/polymethylmethacrylate (PC/PMMA) materials have excellent optical transparency, However, its flexibility is still limited, and it cannot achieve a large-scale bending function. On the other hand, the polymer material used for the cover of the capacitive touch screen should not only have the characteristics of colorlessness and high transmittance, but also should have a relatively high dielectric constant in order to ensure the high sensitivity of the touch device. The dielectric constant of colorless and transparent polymers is often less than 4.5.

At present, the basic method for preparing high dielectric constant polymer materials is to add conductors or high dielectric constant ceramics to the polymer. However, the addition of functional bodies often causes transparent polymers to lose high transparency and change from colorless to colored. Therefore, the conditions for preparing the touch screen cannot be satisfied.

On the other hand, polymer materials will inevitably be subjected to external forces such as scratches and impacts during use, which will cause the performance of the device to decrease or fail. Therefore, while ensuring the colorless, transparent and flexible materials, research and development of self-healable capabilities High dielectric materials have important application value. However, to date, no polymer materials with such comprehensive properties have been reported.

SUMMARY OF THE INVENTION

Technical Problems

In view of the shortcomings of the prior art, the present invention provides transparent flexible polyurethane with high dielectric constant, such as a polyurethane film and a preparation and self-healable method thereof. The polyurethane disclosed by the invention has the characteristics of colorlessness, high transparency, good flexibility, high dielectric constant, self-healable and easy processing, and has broad application prospects, especially flexible capacitive touch display devices.

Technical Solutions

The present invention adopts the following technical solutions:

Transparent flexible polyurethane with high dielectric constant, which the preparation of it including the following steps:
  (1) Mixing up the hydroxyl-terminated polyalkylene carbonate diol, diisocyanate, 2,2'-dithiodiethanol, dibutyltin dilaurate and chloroalkane, and then reacting at 40 to 60° C. for 0.5 to 3 h to obtain the oligomer solution capped with isocyanate;
  (2) Adding polyol cross-linking agent, bistrifluoromethanesulfonimide lithium salt and 1-ethyl-3-methylimidazole bistrifluoromethanesulfonimide salt to the isocyanate-terminated oligomer solution, at 40 to 60° C. for 0.5 to 1.5 h; the solvent is removed to obtain the Transparent flexible polyurethane with high dielectric constant.

A preparation method of transparent flexible polyurethane with high dielectric constant, which the preparation of it including the following steps:
  (1) Mixing up the hydroxyl-terminated polyalkylene carbonate diol, diisocyanate, 2,2'-dithiodiethanol, dibutyltin dilaurate and chloroalkane, and then reacting at 40 to 60° C. for 0.5 to 3 h to obtain the oligomer solution capped with isocyanate;
  (2) Adding polyol cross-linking agent, bistrifluoromethanesulfonimide lithium salt and 1-ethyl-3-methylimidazole bistrifluoromethanesulfonimide salt to the isocyanate-terminated oligomer solution, at 40 to 60° C. for 0.5 to 1.5 h; the solvent is removed to obtain the transparent flexible polyurethane with high dielectric constant.

In the present invention, after the reaction is completed, a reaction solution containing polyurethane is obtained. After drying and removing the solvent, polyurethanes of various structures can be obtained. By changing the shape and size of the mold, polyurethanes of various shapes can be obtained, such as film forming. A polyurethane film can be obtained, and a polyurethane board can be obtained by deposition. Preferably, after the reaction, the solvent is removed from the reaction solution to obtain the transparent flexible polyurethane film with high dielectric constant.

The invention also discloses a self-healable method of the transparent flexible polyurethane film with high dielectric constant, which including the following steps: fixing the damaged surface of the transparent flexible polyurethane with high dielectric constant with a fixture, and then heating at 80 to 150° C. for 0.5 to 2 h to complete the self-healable; the preparation method of the transparent flexible polyurethane with high dielectric constant includes the following step:
  (1) Mixing the hydroxyl-terminated polyalkylene carbonate diol, diisocyanate, 2,2'-dithiodiethanol, dibutyltin dilaurate and chloroalkane, and then reacting at 40 to 60° C. for 0.5 to 3 h to obtain the oligomer solution capped with isocyanate;
  (2) Adding polyol cross-linking agent, bistrifluoromethanesulfonimide lithium salt and 1-ethyl-3-methylimidazole bistrifluoromethanesulfonimide salt to the isocyanate-terminated oligomer solution, reacting at 40 to 60° C. for 0.5 to 1.5 h; after the reaction, the solvent is removed to obtain transparent flexible polyurethane film with high dielectric constant.

In the present invention, transparent flexible polyurethane with high dielectric constant according to claim 1, wherein the chloroalkane is one or a combination of dichloromethane, trichloromethane, 1,2-dichloroethane The diisocyanate compound is one or a combination of isophorone diisocyanate, hexamethylene diisocyanate, dicyclohexylmethane diisocyanate; the polyol crosslinking agent is one or a combination of trimethylolpropane, triethanolamine; the molecular weight of the hydroxyl-terminated polyalkylene carbonate diol is 2000.

In the present invention, transparent flexible polyurethane with high dielectric constant according to claim 1, wherein the mass ratio of the hydroxyl-terminated polyalkylene carbonate diol, diisocyanate, 2,2'-dithiodiethanol, dilauric acid butyl tin, polyol crosslinking agent, bistrifluoromethanesulfonimide lithium salt and 1-ethyl-3-methylimidazole bistrifluoro-methanesulfonimide salt is 100: (50 to 105):(23 to 46):(0.01 to 0.03):(4 to 11):(10 to 40):(10 to 40).

BENEFICIAL EFFECT

Compared with the prior art, the present invention has the following beneficial effects:

1. The polyurethane provided by the present invention contains multiple forces, including dynamic ion-dipole interaction, dynamic hydrogen bond crosslinking, permanent chemical crosslinking, etc., so that it has both high tensile strength and high elongation at break, and has Outstanding bending ability (flexibility).

2. In view of the best flexibility of the polyurethane provided by the present invention, compared with glass and hard plastics, it is not easy to break. Therefore, when applied to a capacitive touch screen cover, it can effectively improve the capacitive touch by reducing the thickness.

3. The polyurethane and polyurethane film provided by the present invention have colorless and highly transparent optical properties. This is because the ionic liquid and lithium salt have good compatibility in the polyurethane matrix, and the transparency of the material will not decrease due to phase separation and precipitation. And no color develops after being dispersed in the resin, so the final material is not only colorless but also has high transmittance.

4. The transparent flexible polyurethane film with high dielectric constant provided by the present invention regulates the formation/dissociation of dynamic hydrogen bonds and dynamic ion-dipole interactions and the exchange rate of disulfide bonds through temperature regulation, thereby realizing the reversible self-healable of the material, And the self-healable effect is significant (>90%).

5. In the transparent flexible polyurethane film with high dielectric constant provided by the present invention, ionic liquid and lithium salt are dispersed in the polyurethane to form many microcapacitors, thereby effectively improving the dielectric constant of the material.

6. The preparation method of polyurethane and polyurethane film provided by the invention has the characteristics of simple operation process, abundant source of raw materials, low manufacturing cost and wide applicability.

EXAMPLES OF THE INVENTION

The technical scheme of the present invention will be further described below in conjunction with the drawings and Examples.

Example 1

(1) At room temperature, mixed up 100 g of hydroxyl-terminated polyalkylene carbonate diol (with a molecular weight of 2000), 67 g of isophorone diisocyanate, 31 g of 2,2'-dithiodiethanol, 0.02 g of dibutyltin dilaurate and 500 g of dichloromethane; the temperature was raised to 55° C. and kept for 1 h to obtain the oligomer solution capped with isocyanate, which was recorded as solution B.

(2) At room temperature, added 4 g of trimethylolpropane, 20 g of bistrifluoromethanesulfonimide lithium salt and 20 g of 1-ethyl-3-methylimidazole bistrifluoromethanesulfonimide salt into solution B, at 60° C. for 1 h; then poured into a mold and dried to obtain transparent flexible polyurethane film with high dielectric constant. The infrared spectra/DTG/UV-vis/digital photos of the original shape/folding/after heated by blower/tensile stress-strain curves/digital photos/bending effect diagrams/the dielectric constants at typical frequency were shown in FIG. 1/FIG. 2/FIG. 3/FIG. 4/FIG. 5/FIG. 6/FIG. 7/FIG. 8.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 100° C. for 1 h to self-healable.

Figure 1:
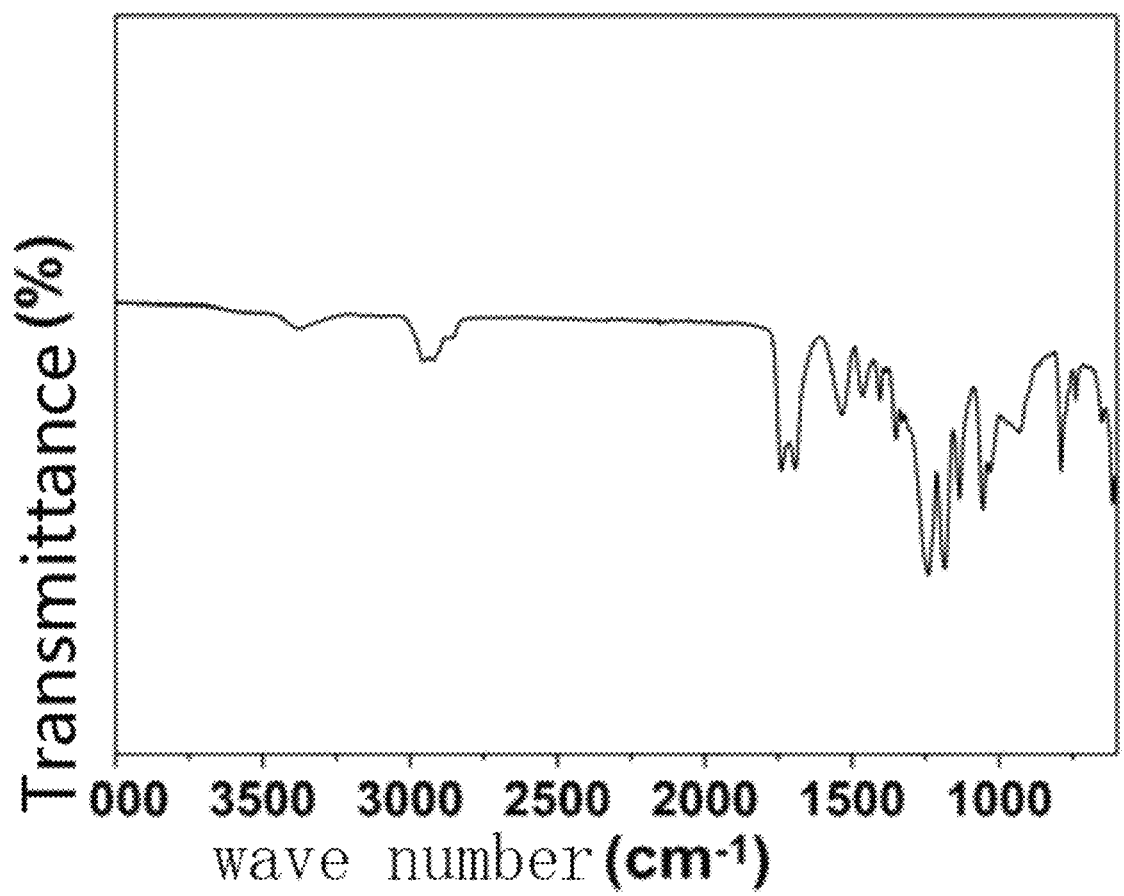
FIG. 1 the infrared spectra of the transparent flexible polyurethane film with high dielectric constant prepared in Example 1.
Figure 2:
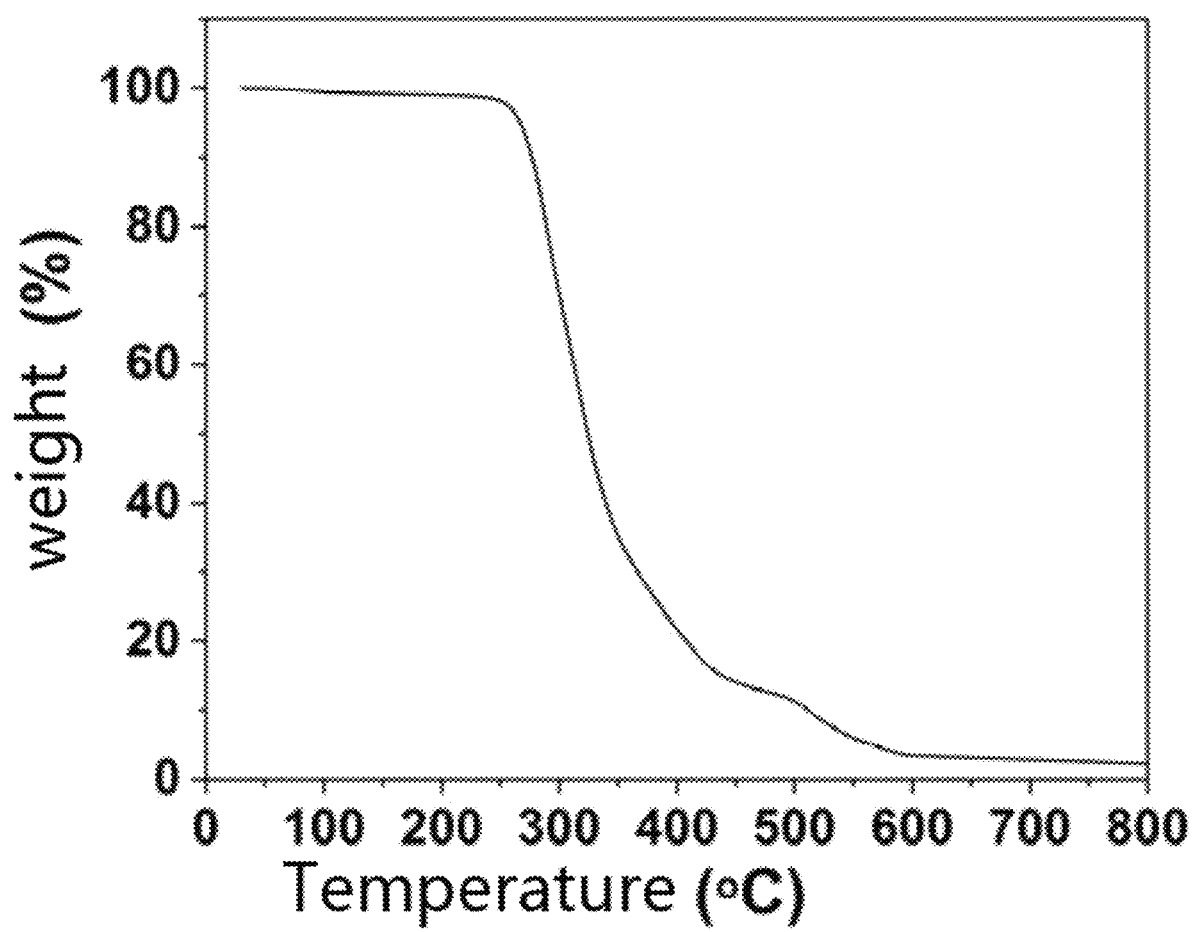
FIG. 2 the DTG of the transparent flexible polyurethane film with high dielectric constant prepared in Example 1 (in nitrogen atmosphere, the heating rate is 10° C./min)
Figure 3:
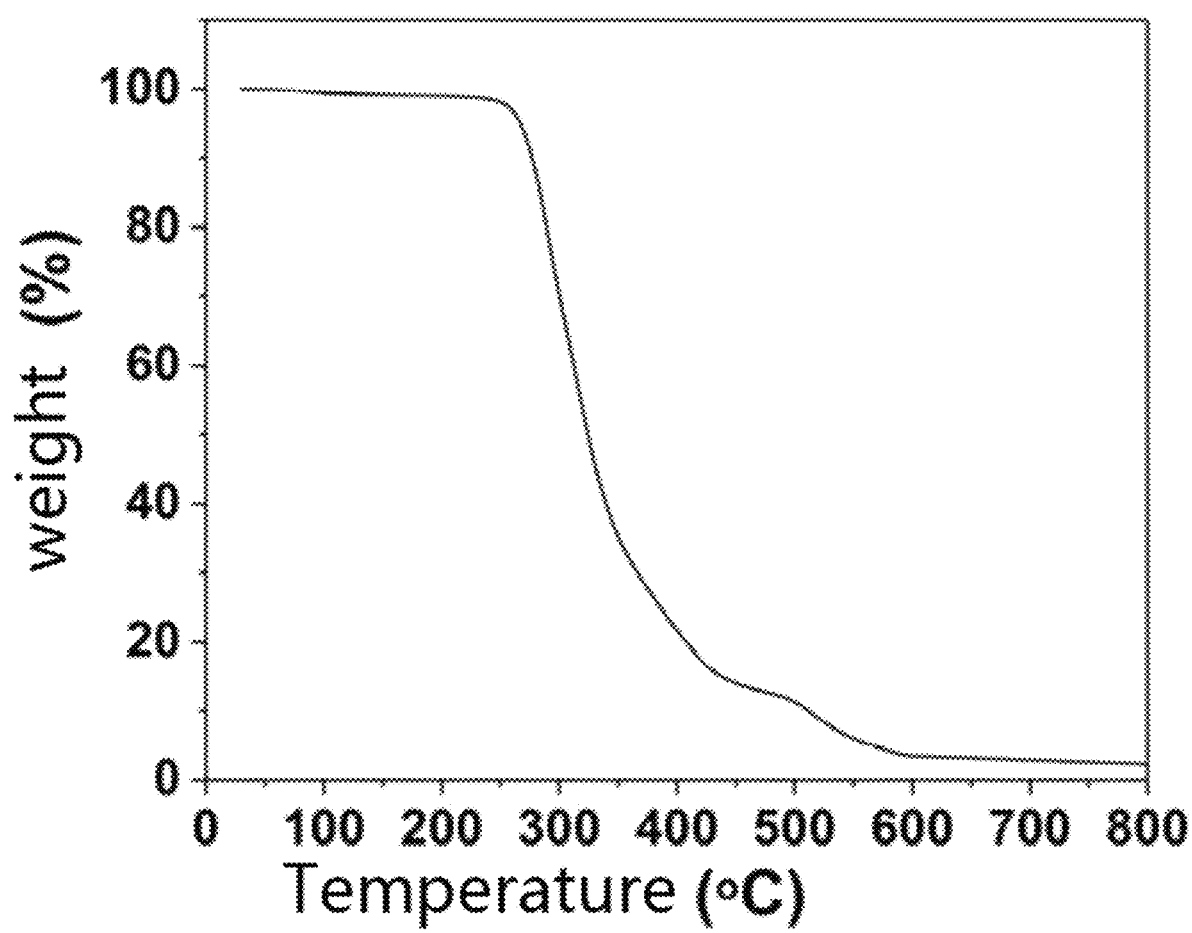
FIG. 3 the UV-vis of the transparent flexible polyurethane film with high dielectric constant prepared in Example 1.
Figure 4:
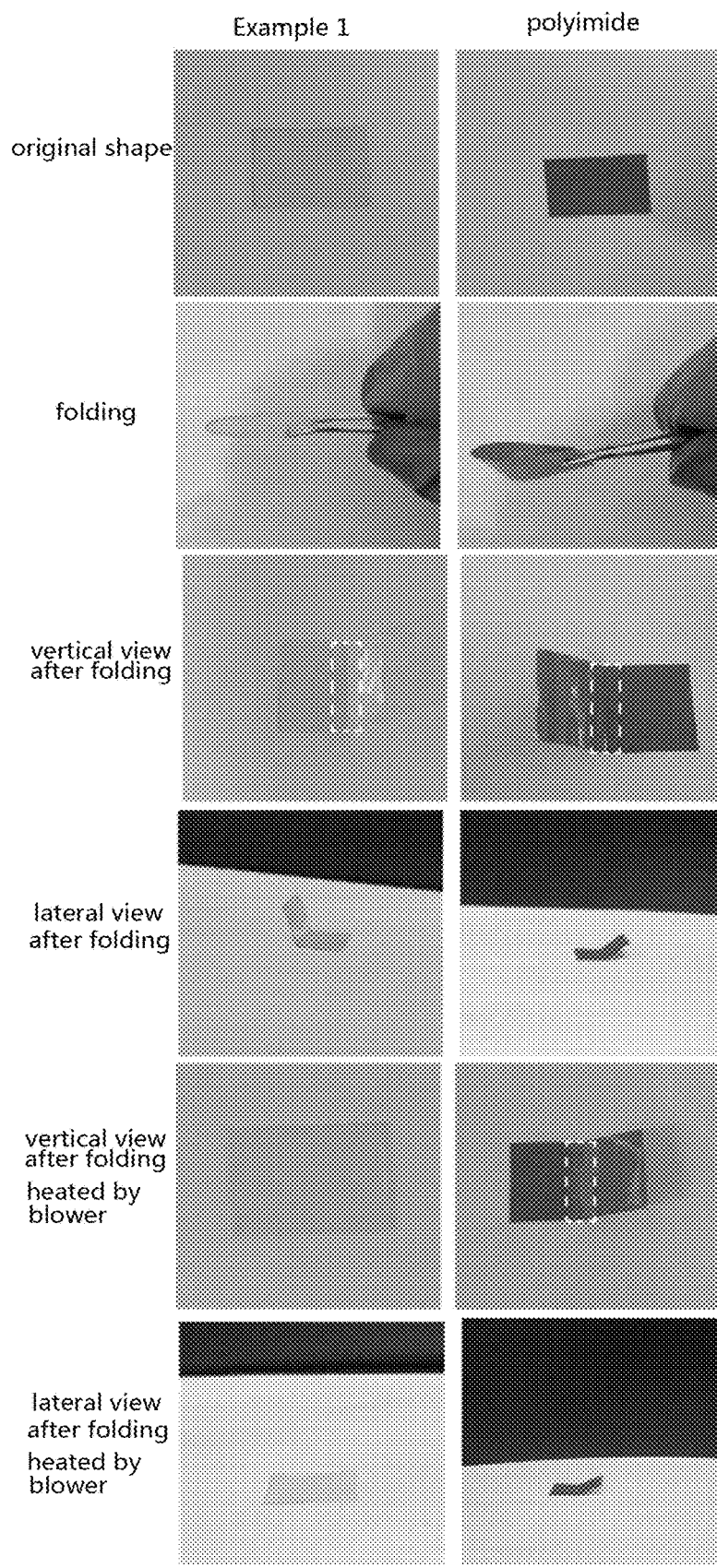
FIG. 4 the digital photos of the original shape/folding/after heated by blower for 3 min((about 80%° C.) of transparent flexible polyurethane film with high dielectric constant prepared in Example 1 and commercial polyimide film (now widely used in flexible devices)
Figure 5:
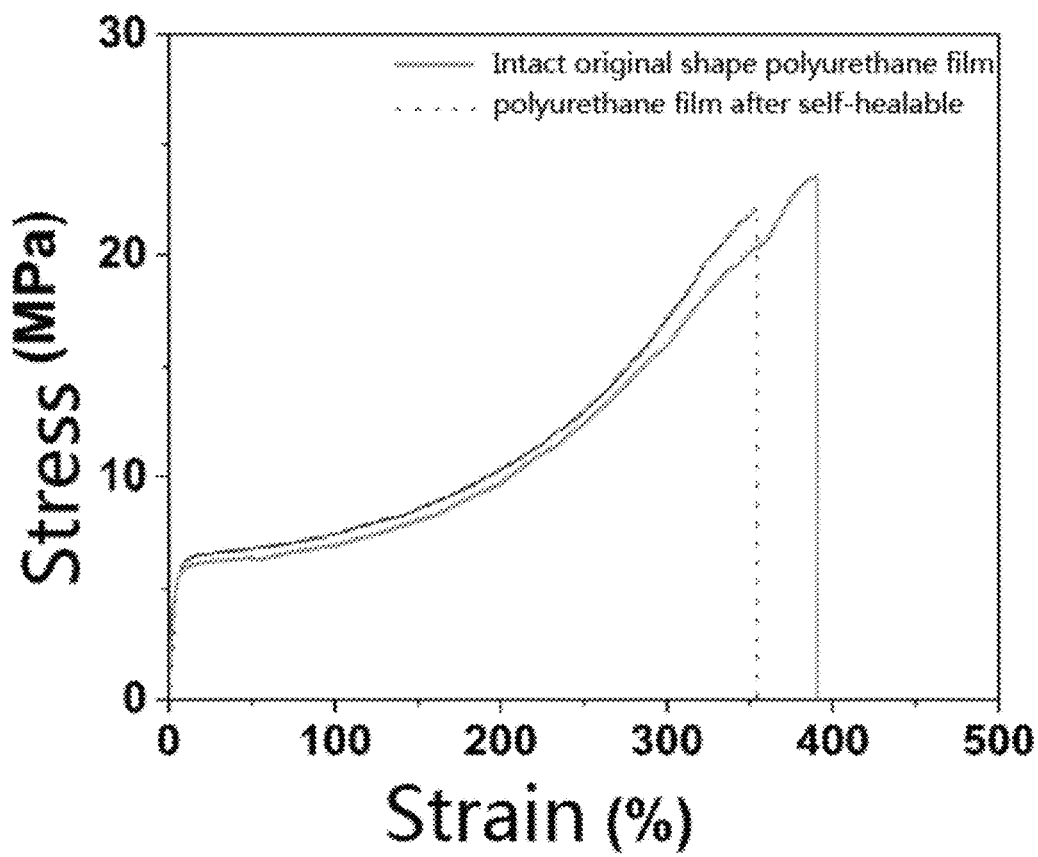
FIG. 5 tensile stress-strain curves of the intact original shape and after self-healable of transparent flexible polyurethane film with high dielectric constant in Example 1.
Figure 6:
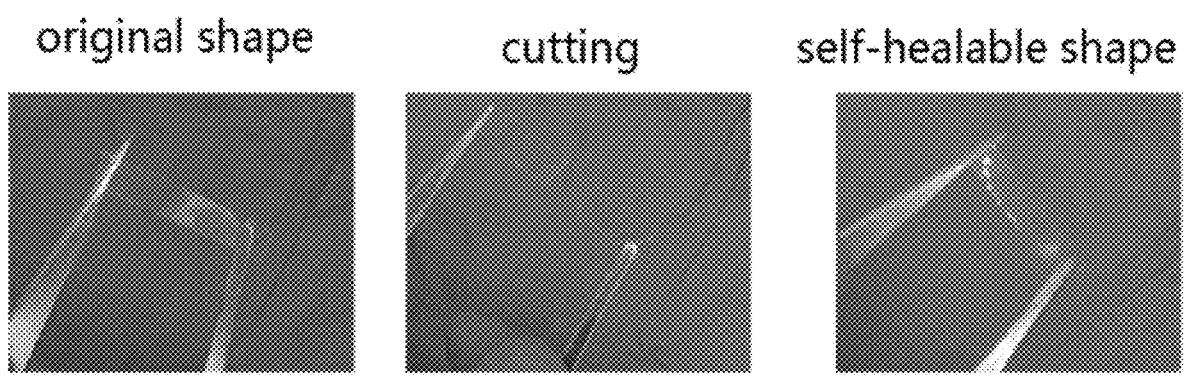
FIG. 6 the digital photos of the intact original shape and after self-healable of transparent flexible polyurethane film with high dielectric constant in Example 1.
Figure 7:
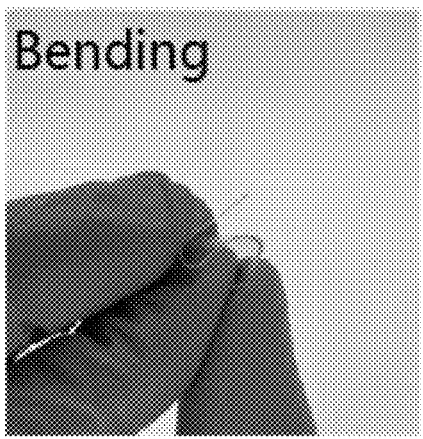
FIG. 7 bending effect diagrams of the intact original shape and after self-healable of transparent flexible polyurethane film with high dielectric constant in Example 1.
Figure 7:
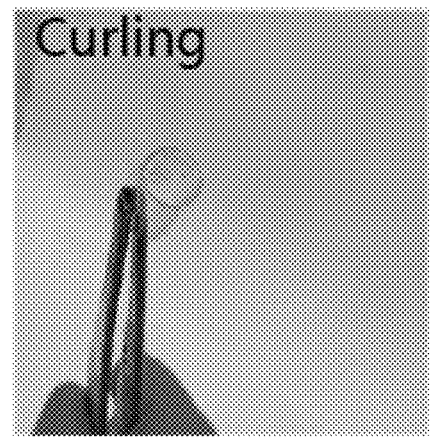
Figure 7:
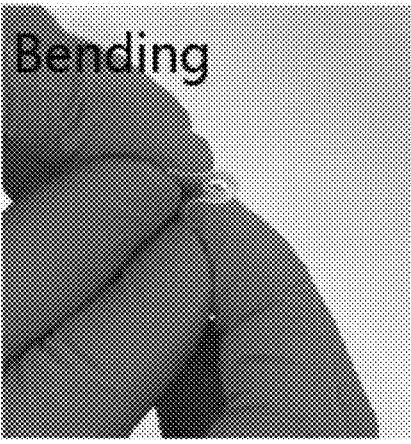
Figure 7:
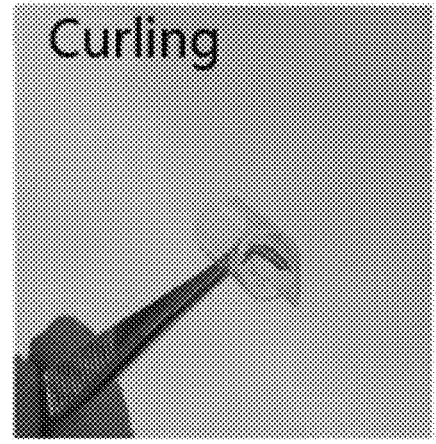
Figure 8:
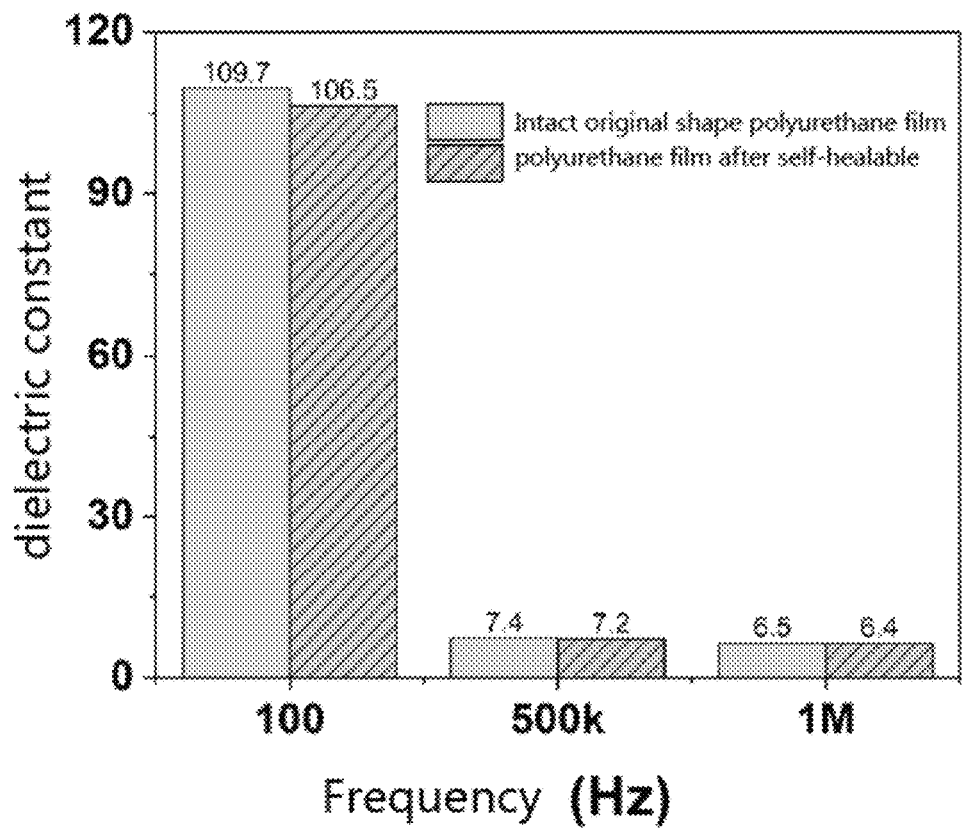
FIG. 8 the dielectric constants at typical frequency of before and after self-healable of transparent flexible polyurethane film with high dielectric constant in Example 1.

Tensile stress-strain curves of the intact original shape and after self-healable/the digital photos/ bending effect diagrams of the intact original shape and after self-healable/the dielectric constants were shown in FIG. 1/FIG. 2/FIG. 3/FIG. 4/FIG. 5/FIG. 6/FIG. 7/FIG. 8. The photomicrographs of the polyurethane film after fracture and self-healable were shown in FIG. 9.

As shown in FIG. 1, it is the infrared spectra of the transparent flexible polyurethane film with high dielectric constant prepared in Example 1. The characteristic peak of stretching vibration (3389 cm$^{-1}$) and the peak of bending vibration (1538 cm$^{-1}$) of —NH— can be seen from it, but it is not seen the characteristic peak of —NCO (2260 cm$^{-1}$), which indicates that it was already isophorone diisocyanate and 2,2'-dithiodiethanol and the hydroxyl-terminated polyalkylene carbonate diol had extended the chain, and completed the construction of the cross-linked network by the reaction with trimethylolpropane.

As shown in FIG. 2, it is the DTG of the transparent flexible polyurethane film with high dielectric constant prepared in Example 1 (in nitrogen atmosphere, the heating rate is 10° C./min). It can be seen the initial thermal decomposition temperature (temperature at 5 wt % weight loss, $T_{di}$) of transparent flexible polyurethane film with high dielectric constant was 270° C,which was within 250 to 300° C. of polyurethane $T_{di}$.

As shown in FIG. 3, it is the UV-vis of the transparent flexible polyurethane film with high dielectric constant prepared in Example 1. With air as the baseline, the transmittance of a film with a thickness of 0.2 mm at the wavelength from 300 to 800 nm was tested. The transmittance in the visible wavelength range from 380 to 780 nm was greater than 90.2%, and its transmittance was comparable to that of the market. Corning's fifth-generation Gorilla Glass, which was widely used as a touch screen cover for mobile phones, had the same transmittance.

As shown in FIG. 4, it is the digital photos of the original shape/folding/after heated by blower for 3 min((about 80%° C.) of transparent flexible polyurethane film with high dielectric constant prepared in Example 1 and commercial polyimide film (now widely used in flexible devices). It can be seen that transparent flexible polyurethane film with high dielectric constant prepared in Example 1 of the invention had a shallow crease mark after folding in half, eliminate the crease under the action of a hair dryer, and the self-healable sample was flat. In sharp contrast, the polyimide film, after being folded in half, the mark of the crease cannot be eliminated under the action of the hair dryer, and the sample was warped, indicating that there were no insufficient in the transparent flexible polyurethane film with high dielectric constant prepared in Example 1.

As shown in FIG. 5, it is tensile stress-strain curves of the intact original shape and after self-healable of transparent flexible polyurethane film with high dielectric constant in Example 1. It can be seen that the original tensile strength and elongation at break of the polyurethane film are 23.54±1.52 MPa and 390.6±10.24%, respectively. After self-healable, the tensile strength and elongation at break of the material are 22.13±1.24 MPa and 358.36±11.24%, respectively, and the corresponding self-healable efficiency are 94.01% and 91.74%, respectively. Compared with similar self-healing polyurethane materials, it had the characteristics of short self-healable time and high self-healable efficiency.

As shown in FIG. 6, it is the digital photos of the intact original shape and after self-healable of transparent flexible polyurethane film with high dielectric constant in Example 1. Cutting the intact original shape of transparent flexible polyurethane film with high dielectric constant, the sections are tightly bonded together; then kept at 100° C. for 1 h, the two completely broken films were reconnected into a whole, the material still had excellent optical transparency after self-healable.

As shown in FIG. 7, it is bending effect diagrams of the intact original shape and after self-healable of transparent flexible polyurethane film with high dielectric constant in Example 1; It can be seen that the intact original polyurethane film can be bent into an S shape, and can be curled, and its flexibility is better than that of PMMA. In addition, the polyurethane film after self-healing still maintains excellent flexibility.

As shown in FIG. 8, it is the dielectric constants at typical frequency of before and after self-healable of transparent flexible polyurethane film with high dielectric constant in Example 1. It can be seen that after the heating treatment, the dielectric constant of the material remains basically unchanged at different frequencies, indicating that the material has an excellent self-healing effect.

Comparative 1

(1) At room temperature, mixed up 100 g of hydroxyl-terminated polyalkylene carbonate diol (with a molecular weight of 2000), 67 g of isophorone diisocyanate, 24 g of 1,6 hexanediol, 0.02 g of dibutyltin dilaurate and 500 g of dichloromethane; the temperature was raised to 60° C. and kept for 1.5 h to obtain the isocyanate-terminated polycarbonate solution without disulfide bonds, which was recorded as solution C.

(2) At room temperature, added 4 g of trimethylolpropane, 20 g of bistrifluoromethanesulfonimide lithium salt and 20 g of 1-ethyl-3-methylimidazole bistrifluoromethanesulfonimide salt into solution C, at 60° C. for 1 h; then poured into a mold and dried to obtain polyurethane film. The dielectric constant-frequency curves were shown in FIG. 10.

(3) Fully contact the two sections of the above-mentioned of damaged polyurethane film to ensure that they fit tightly, and then heated at 100° C. for 1 h to self-healable. The microscopic photos of the film after fracture and self-healable were shown in FIG. 9. After processing, the sections cannot be bonded together, and the self-healable efficiency was 0. Because there was no self-healable, the dielectric constant after self-healable cannot be tested under the same conditions.

Figure 9:
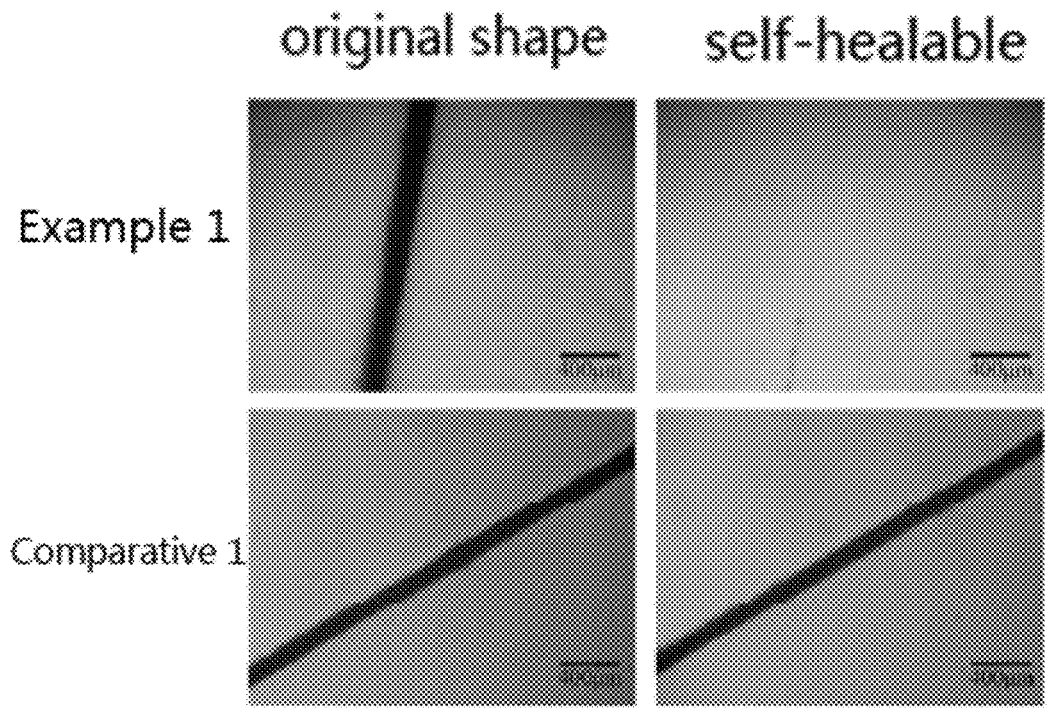
FIG. 9 photomicrographs of transparent flexible polyurethane film with high dielectric constant in Example 1 and disulfide bond-free polyurethane film prepared in comparative 1 after fracture and self-healable.

As shown in FIG. 9, photomicrographs of transparent flexible polyurethane film (0.2 mm thick) with high dielectric constant in Example 1 and disulfide bond-free polyurethane film (0.2 mm thick) prepared in comparative 1 after fracture and self- healable. With a surgical blade to make a section of about 50 μm wide on the surface of transparent flexible polyurethane film with high dielectric constant. After the section is effectively contacted, it is placed on a hot stage at 100° C. and heated for 1 h. After the self-healable, the original strip shape the opaque black area becomes transparent, leaving only a few scars that resemble the healing of a human wound. In contrast, under the same self-healable conditions, the polyurethane film prepared in Comparative 1 could not achieve the healing of cracks, and the black striped areas did not disappear. This shows that even if the temperature rises to 100° C., due to the existence of the permanent chemical cross-linking network, the mobility of the material chain segment is still greatly restricted. It shows that the new colorless and transparent high-dielectric constant flexible polyurethane film disclosed in the present invention can self-healable.

Comparative 2

(1) Prepared solution B according to the procedure in Example 1.

(2) At room temperature, added 4 g of trimethylolpropane into solution C, at 60° C. for 1 h; then poured into a mold and dried to obtain polyurethane film. The dielectric constant-frequency curves were shown in FIG. 10.

(3) The self-healable method of the above-mentioned polyurethane film is: self-healable method after fracture. Fully contact the fractured surface of the colorless and transparent polyurethane film to ensure that it fits tightly, and then heat it at a temperature of 100° C. for 1 h. The tensile strength and elongation at break of the intact film are 26.45±2.40 MPa and 358.24±9.5%, respectively, and the tensile strength and elongation at break of the self-healableed film are 23.35±4.22 MPa and 321.55±12.5%, respectively. The self-healable efficiency of tensile strength and elongation at break were 88.28% and 89.75%, respectively.

Figure 10:
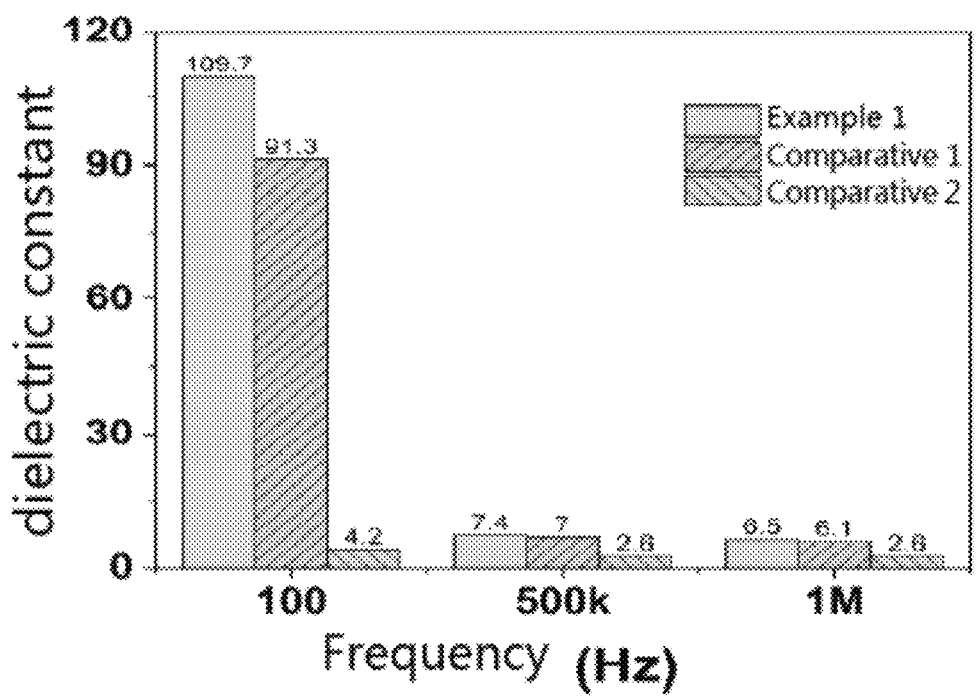
FIG. 10 the dielectric constants at typical frequency of transparent flexible polyurethane film with high dielectric constant in Example 1 and disulfide bond-free polyurethane film prepared in comparative 1 and without bistrifluoromethanesulfonimide salt polyurethane film prepared in comparative 2.
Figure 11:
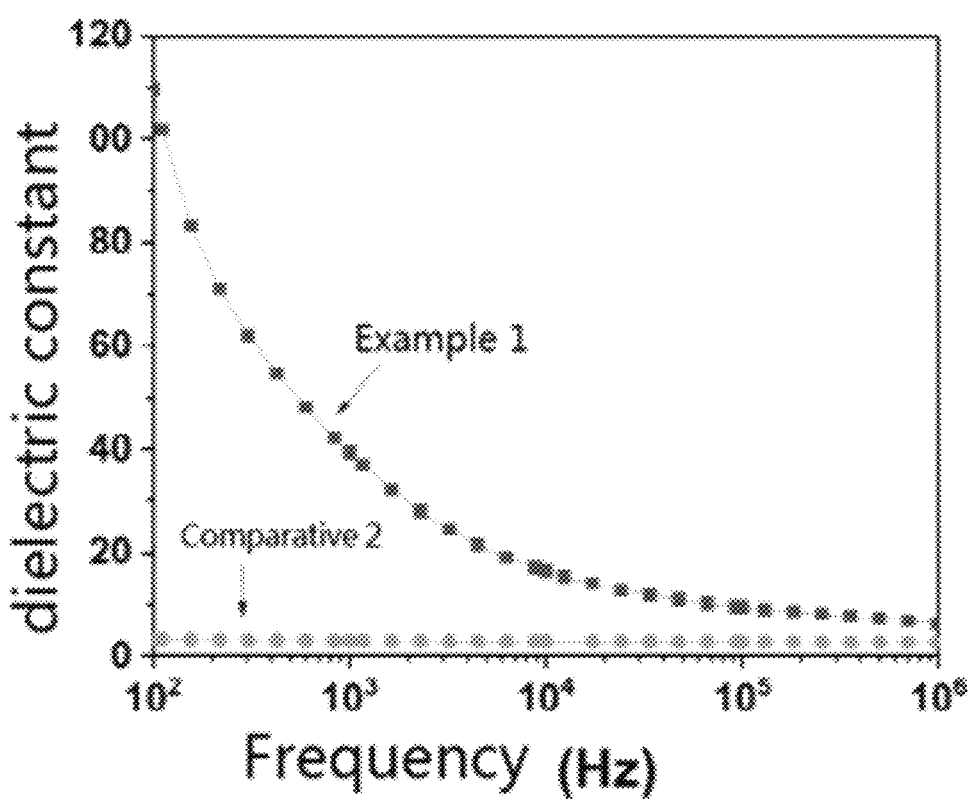
FIG. 11 the dielectric constant-frequency curves of transparent flexible polyurethane film with high dielectric constant in Example 1 and polyurethane film prepared in comparative 2.

See FIG. 10 and FIG. 11, which are the dielectric constants at typical frequency of transparent flexible polyurethane film with high dielectric constant in Example 1 and disulfide bond-free polyurethane film prepared in comparative 1 and without bistrifluoro-methanesulfonimide salt polyurethane film prepared in comparative 2;

the dielectric constant-frequency curves of transparent flexible polyurethane film with high dielectric constant in Example 1 and polyurethane film prepared in comparative 2. It can be seen that the dielectric constants were 109.7, 7.4 and 6.5 of at frequency of 100 Hz, 500 kHz and 1 MHz of transparent flexible polyurethane film with high dielectric constant in Example 1. Compared with the polyurethane film prepared in Comparative 2, the dielectric constants were increased by 32 times, 1.8 times and 1.7 times.

Example 2

(1) At room temperature, mixed up 100 g of hydroxyl-terminated polyalkylene carbonate diol (with a molecular weight of 2000), 50 g of hexamethylene diisocyanate, 23 g of 2,2'-dithiodiethanol, 0.01 g of dibutyltin dilaurate, 500 g of dichloromethane and 500 g of chloroform; the temperature was raised to 60° C. and kept for 0.5 h to obtain the oligomer solution capped with isocyanate, which was recorded as solution D.

(2) At room temperature, added 9 g of trimethylolpropane, 10 g of bistrifluoromethanesulfonimide lithium salt and 40 g of 1-ethyl-3-methylimidazole bistrifluoromethanesulfonimide salt into solution D, at 60° C. for 1 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 80° C. for 2 h to self-healable. The completely broken two parts of the film are reconnected into a whole, and the repaired material still has excellent optical transparency, and the repair efficiency corresponding to the tensile strength and elongation at break of the material is 93.89% and 91.12%, respectively.

Example 3

(1) At room temperature, mixed up 100 g of hydroxyl-terminated polyalkylene carbonate diol (with a molecular weight of 2000), 105 g of cyclohexylmethane diisocyanate, 35 g of 2,2'-dithiodiethanol, 0.03 g of dibutyltin dilaurate, 300 g of dichloromethane and 300 g of 1,2 dichloroethane; the temperature was raised to 60° C. and kept for 1 h to obtain the oligomer solution capped with isocyanate, which was recorded as solution E.

(2) At room temperature, added 11 g of trimethylolpropane, 40 g of bistrifluoromethanesulfonimide lithium salt and 30 g of 1-ethyl-3-methylimidazole bistrifluoromethanesulfonimide salt into solution E, at 40° C. for 1 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 150° C. for 0.5 h to self-healable.

Example 4

(1) At room temperature, mixed up 100 g of hydroxyl-terminated polyalkylene carbonate diol (with a molecular weight of 2000), 33 g of isophorone diisocyanate, 25 g of hexamethylene diisocyanate, 31 g of 2,2'-dithiodiethanol, 0.01 g of dibutyltin dilaurate and 500 g of dichloromethane and 300 g of chloroform; the temperature was raised to 40° C. and kept for 3 h to obtain the oligomer solution capped with isocyanate, which was recorded as solution F.

(2) At room temperature, added 4 g of trimethylolpropane, 25 g of bistrifluoromethanesulfonimide lithium salt and 10 g of 1-ethyl-3-methylimidazole bistrifluoromethanesulfonimide salt into solution F, at 60° C. for 0.5 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 120° C. for 1.2 h to self-healable.

Example 5

(1) At room temperature, mixed up 100 g of hydroxyl-terminated polyalkylene carbonate diol (with a molecular weight of 2000), 33 g of isophorone diisocyanate, 39 g of dicyclohexylmethane diisocyanate, 31 g of 2,2'-dithiodiethanol, 0.02 g of dibutyltin dilaurate and 1500 g of dichloromethane; the temperature was raised to 60° C. and kept for 1 h to obtain the oligomer solution capped with isocyanate, which was recorded as solution G.

(2) At room temperature, added 4 g of trimethylolpropane, 25 g of bistrifluoromethanesulfonimide lithium salt and 25 g of 1-ethyl-3-methylimidazole bistrifluoromethanesulfonimide salt into solution G, at 60° C. for 1 h; then poured to a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 100° C. for 1 h to self-healable.

Example 6

(1) At room temperature, mixed up 100 g of hydroxyl-terminated polyalkylene carbonate diol (with a molecular weight of 2000), 22 g of isophorone diisocyanate, 17 g of hexamethylene diisocyanate, 26 g of dicyclohexylmethane diisocyanate, 31 g of 2,2'-dithiodiethanol, 0.03 g of dibutyltin dilaurate and 500 g of dichloromethane and 300 g of chloroform; the temperature was raised to 55° C. and kept for 1 h to obtain the oligomer solution capped with isocyanate, which was recorded as solution H.

(2) At room temperature, added 4 g of trimethylolpropane, 30 g of bistrifluoromethanesulfonimide lithium salt and 25 g of 1-ethyl-3-methylimidazole bistrifluoromethanesulfonimide salt into solution H, at 60° C. for 0.5 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 100° C. for 1.2 h to self-healable.

Example 7

(1) At room temperature, mixed up 100 g of hydroxyl-terminated polyalkylene carbonate diol (with a molecular weight of 2000), 67 g of isophorone diisocyanate, 31 g of 2,2'-dithiodiethanol, 0.02 g of dibutyltin dilaurate and 500 g of dichloromethane; the temperature was raised to 40° C. and kept for 3 h to obtain the oligomer solution capped with isocyanate, which was recorded as solution I.

(2) At room temperature, added 5 g of triethanolamine, 20 g of bistrifluoromethanesulfon imide lithium salt and 20 g of 1-ethyl-3-methylimidazole bistrifluoromethanesulfonimide salt into solution I, at 45° C. for 1.5 h; then poured into a mold and dried to obtain transparent flexible polyurethane film with high dielectric constant. The dielectric constants at 100 Hz, 500 kHz and 1 MHz were 102.9, 7.3 and 6.4, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 150° C. for 0.5 h to self-healable.

Example 8

(1) At room temperature, mixed up 100 g of hydroxyl-terminated polyalkylene carbonate diol (with a molecular weight of 2000), 67 g of isophorone diisocyanate, 31 g of 2,2'-dithiodiethanol, 0.02 g of dibutyltin dilaurate and 500 g of dichloromethane; the temperature was raised to 55° C. and kept for 2.5 h to obtain the oligomer solution capped with isocyanate, which was recorded as solution J.

(2) At room temperature, added 2 g of trimethylolpropane and 2.5 g of triethanolamine, 20 g of bistrifluoromethanesulfonimide lithium salt and 20 g of 1-ethyl-3-methylimidazole bistrifluoromethanesulfonimide salt into solution J, at 60° C. for 1.5 h; then poured into a mold and dried to obtain transparent flexible polyurethane film with high dielectric constant. The dielectric constants at 100 Hz, 500 kHz and 1 MHz were 106.7, 7.3 and 6.1, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 100° C. for 1.5 h to self-healable. The completely broken two parts of the film are reconnected into a whole, and the repaired material still has excellent optical transparency, and the repair efficiency corresponding to the tensile strength and elongation at break of the material is 93.15% and 91.06%, respectively.

Example 9

(1) At room temperature, mixed up 100 g of hydroxyl-terminated polyalkylene carbonate diol (with a molecular weight of 2000), 79 g of cyclohexylmethane diisocyanate, 31 g of 2,2'-dithiodiethanol, 0.01 g of dibutyltin dilaurate, 850 g of dichloromethane and 160 g of 1,2 dichloroethane; the temperature was raised to 55° C. and kept for 2 h to obtain the oligomer solution capped with isocyanate, which was recorded as solution K.

(2) At room temperature, added 5 g of triethanolamine, 25 g of bistrifluoromethanesulfonimide lithium salt and 20 g of 1-ethyl-3-methylimidazole bistrifluoromethanesulfonimide salt into solution K, at 40° C. for 1 h; then poured into a mold and dried to obtain transparent flexible polyurethane film with high dielectric constant. The dielectric constants at 100 Hz, 500 kHz and 1 MHz were 103.3, 7.5 and 6.4, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 96° C. for 1.2 h to self-healable.

Example 10

(1) At room temperature, mixed up 100 g of hydroxyl-terminated polyalkylene carbonate diol (with a molecular weight of 2000), 79 g of cyclohexylmethane diisocyanate, 31 g of 2,2'-dithiodiethanol, 0.02 g of dibutyltin dilaurate, 150 g of chloroform and 875 g of dichloromethane; the temperature was raised to 60° C. and kept for 1.5 h to obtain the oligomer solution capped with isocyanate, which was recorded as solution L.

(2) At room temperature, added 5 g of triethanolamine, 10 g of bistrifluoromethanesulfonimide lithium salt and 10 g of 1-ethyl-3-methylimidazole bistrifluoromethanesulfonimide salt into solution L, at 60° C. for 0.75 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 108° C. for 1 h to self-healable.

Example 11

(1) At room temperature, mixed up 100 g of hydroxyl-terminated polyalkylene carbonate diol (with a molecular weight of 2000), 50 g of hexamethylene diisocyanate, 31 g of 2,2'-dithiodiethanol, 0.03 g of dibutyltin dilaurate, 915 g of chloroform and 175 g of 1,2-dichloroethane; the temperature was raised to 60° C. and kept for 0.5 h to obtain the oligomer solution capped with isocyanate, which was recorded as solution M.

(2) At room temperature, added 5 g of triethanolamine, 12.5 g of bistrifluoromethanesulfonimide lithium salt and 15 g of 1-ethyl-3-methylimidazole bistrifluoromethanesulfonimide salt into solution M, at 55° C. for 1.25 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 150° C. for 0.5 h to self-healable.

Example 12

(1) At room temperature, mixed up 100 g of hydroxyl-terminated polyalkylene carbonate diol (with a molecular weight of 2000), 79 g of cyclohexylmethane diisocyanate, 31 g of 2,2'-dithiodiethanol, 0.01 g of dibutyltin dilaurate, 500 g of dichloromethane, 500 g of chloroform and 500 g of 1,2 dichloroethane; the temperature was raised to 45° C. and kept for 2.5 h to obtain the oligomer solution capped with isocyanate, which was recorded as solution N.

(2) At room temperature, added 5 g of triethanolamine, 15 g of bistrifluoromethanesulfonimide lithium salt and 17.5 g of 1-ethyl-3-methylimidazole bistrifluoromethanesulfonimide salt into solution N, at 60° C. for 0.8 h; then poured into a mold and dried to obtain transparent flexible polyurethane film with high dielectric constant. The dielectric constants at 100 Hz, 500 kHz and 1 MHz were 101.7, 6.0 and 5.9, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 143° C. for 0.75 h to self-healable. The completely broken two parts of the film are reconnected into a whole, and the repaired material still has excellent optical transparency, and the repair efficiency corresponding to the tensile strength and elongation at break of the material is 92.98% and 91.02%, respectively.

Example 13

(1) At room temperature, mixed up 100 g of hydroxyl-terminated polyalkylene carbonate diol (with a molecular weight of 2000), 50 g of hexamethylene diisocyanate, 31 g of 2,2'-dithiodiethanol, 0.02 g of dibutyltin dilaurate, 1200 g of dichloromethane; the temperature was raised to 50° C. and kept for 0.5 h to obtain the oligomer solution capped with isocyanate, which was recorded as solution O.

(2) At room temperature, added 5 g of triethanolamine, 17.5 g of bistrifluoromethanesulfonimide lithium salt and 12.5 g of 1-ethyl-3-methylimidazole bistrifluoromethanesulfonimide salt into solution O, at 50° C. for 1 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 90° C. for 1.2 h to self-healable.

Example 14

(1) At room temperature, mixed up 100 g of hydroxyl-terminated polyalkylene carbonate diol (with a molecular weight of 2000), 50 g of hexamethylene diisocyanate, 31 g of 2,2'-dithiodiethanol, 0.02 g of dibutyltin dilaurate, 740 g of chloroform; the temperature was raised to 60° C. and kept for 1 h to obtain the oligomer solution capped with isocyanate, which was recorded as solution P.

(2) At room temperature, added 2 g of trimethylolpropane and 2.5 g of triethanolamine, 15 g of bistrifluoromethanesulfonimide lithium salt and 30 g of 1-ethyl-3-methylimidazole bistrifluoromethanesulfonimide salt into solution P, at 55° C. for 1.5 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 100° C. for 1.25 h to self-healable.

Example 15

(1) At room temperature, mixed up 100 g of hydroxyl-terminated polyalkylene carbonate diol (with a molecular weight of 2000), 79 g of cyclohexylmethane diisocyanate, 31 g of 2,2'-dithiodiethanol, 0.01 g of dibutyltin dilaurate, 1050 g of dichloromethane; the temperature was raised to 60° C. and kept for 1 h to obtain the oligomer solution capped with isocyanate, which was recorded as solution Q.

(2) At room temperature, added 2.5 g of triethanolamine and 2 g of trimethylolpropane, 20 g of bistrifluoromethanesulfonimide lithium salt and 20 g of 1-ethyl-3-methylimidazole bistrifluoromethanesulfonimide salt into solution Q, at 48° C. for 1.25 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 115° C. for 1 h to self-healable.

Example 16

(1) At room temperature, mixed up 100 g of hydroxyl-terminated polyalkylene carbonate diol (with a molecular weight of 2000), 33 g of isophorone diisocyanate, 25 g of hexamethylene diisocyanate, 31 g of 2,2'-dithiodiethanol, 0.01 g of dibutyltin dilaurate and 1025 g of 1,2 dichloroethane; the temperature was raised to 50° C. and kept for 1.5 h to obtain the oligomer solution capped with isocyanate, which was recorded as solution R.

(2) At room temperature, added 5 g of trimethylolpropane, 15 g of bistrifluoromethanesulfonimide lithium salt and 15 g of 1-ethyl-3-methylimidazole bistrifluoromethanesulfonimide salt into solution R, at 56° C. for 0.75 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 120° C. for 0.8 h to self-healable.

Example 17

(1) At room temperature, mixed up 100 g of hydroxyl-terminated polyalkylene carbonate diol (with a molecular weight of 2000), 33 g of isophorone diisocyanate and 39 g of cyclohexylmethane diisocyanate, 31 g of 2,2'-dithiodiethanol, 0.02 g of dibutyltin dilaurate and 760 g of dichloromethane; the temperature was raised to 57° C. and kept for 1 h to obtain the oligomer solution capped with isocyanate, which was recorded as solution S.

(2) At room temperature, added 1.25 g of trimethylolpropane and 3 g of trimethylolpropane, 20 g of bistrifluoromethanesulfonimide lithium salt and 20 g of 1-ethyl-3-methylimidazole bistrifluoromethanesulfonimide salt into solution S, at 60° C. for 0.5 h; then poured into a mold and dried to obtain transparent flexible polyurethane film with high dielectric constant. The dielectric constants at 100 Hz, 500 kHz and 1 MHz were 105.9, 7.2 and 6.2, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 150° C. for 0.75 h to self-healable.

Example 18

(1) At room temperature, mixed up 100 g of hydroxyl-terminated polyalkylene carbonate diol (with a molecular weight of 2000), 22 g of isophorone diisocyanate, 17 g of hexamethylene diisocyanate, 26 g of dicyclohexylmethane diisocyanate, 31 g of 2,2'-dithiodiethanol, 0.02 g of dibutyltin dilaurate and 645 g of chloroform; the temperature was raised to 65° C. and kept for 1 h to obtain the oligomer solution capped with isocyanate, which was recorded as solution T.

(2) At room temperature, added 1.25 g of triethanolamine and 3 g of trimethylolpropane, 25 g of bistrifluoromethanesulfonimide lithium salt and 25 g of 1-ethyl-3-methylimidazole bistrifluoromethanesulfonimide salt into solution T, at 55° C. for 1 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 80° C. for 1.5 h to self-healable.

Example 19

(1) At room temperature, mixed up 100 g of hydroxyl-terminated polyalkylene carbonate diol (with a molecular weight of 2000), 67 g of isophorone diisocyanate, 31 g of 2,2'-dithiodiethanol, 0.02 g of dibutyltin dilaurate and 765 g of dichloromethane; the temperature was raised to 60° C. and kept for 1 h to obtain the oligomer solution capped with isocyanate, which was recorded as solution U.

(2) At room temperature, added 4 g of trimethylolpropane, 12.5 g of bistrifluoromethanesulfonimide lithium salt and 12.5 g of 1-ethyl-3-methylimidazole bistrifluoromethanesulfonimide salt into solution U, at 45° C. for 0.75 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 128° C. for 0.75 h to self-healable.

Example 20

(1) At room temperature, mixed up 100 g of hydroxyl-terminated polyalkylene carbonate diol (with a molecular weight of 2000), 89 g of isophorone diisocyanate, 46 g of 2,2'-dithiodiethanol, 0.02 g of dibutyltin dilaurate and 800 g of dichloromethane; the temperature was raised to 58° C. and kept for 3 h to obtain the oligomer solution capped with isocyanate, which was recorded as solution V.

(2) At room temperature, added 4 g of trimethylolpropane, 16 g of bistrifluoromethanesulfonimide lithium salt and 19 g of 1-ethyl-3-methylimidazole bistrifluoromethanesulfonimide salt into solution V, at 60° C. for 0.5 h; then poured into a mold and dried to obtain transparent flexible polyurethane film with high dielectric constant. The dielectric constants at 100 Hz, 500 kHz and 1 MHz were 104.8, 7.2 and 6.0, respectively.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 110° C. for 1 h to self-healable.

Example 21

(1) At room temperature, mixed up 100 g of hydroxyl-terminated polyalkylene carbonate diol (with a molecular weight of 2000), 67 g of isophorone diisocyanate, 31 g of 2,2'-dithiodiethanol, 0.02 g of dibutyltin dilaurate and 855 g of dichloromethane; the temperature was raised to 55° C. and kept for 1.5 h to obtain the oligomer solution capped with isocyanate, which was recorded as solution W.

(2) At room temperature, added 4 g of trimethylolpropane, 22.5 g of bistrifluoromethanesulfonimide lithium salt and 15.5 g of 1-ethyl-3-methylimidazole bistrifluoromethanesulfonimide salt into solution W, at 52° C. for 1.5 h; then poured into a mold and dried to obtain transparent flexible polyurethane film with high dielectric constant.

(3) The way of self-healable of transparent flexible polyurethane compound material with high dielectric constant is: self-healable method after fracture. Fully contact the two sections of the above-mentioned of damaged polyurethane film to ensure that they fit tightly, and then heated at 99° C. for 1.5 h to self-healable. The completely broken two parts of the film are reconnected into a whole, and the repaired material still has excellent optical transparency, and the repair efficiency corresponding to the tensile strength and elongation at break of the material is 92.59% and 91.07%, respectively.

The polyurethane film provided by the present invention has multiple functions. At room temperature, the film has multi-scale forces such as ion-dipole interaction, hydrogen bond dynamic crosslinking and permanent chemical crosslinking, so it has both high mechanical strength and high Flexibility; Under heating conditions, the ion-dipole and hydrogen bond interactions dissociate, and at the same time the disulfide bond exchange rate is accelerated. These structural changes make the polyurethane have good reversible self-repair properties. In the polyurethane film prepared by the present invention, the ionic liquid/lithium salt has good compatibility with the polymer matrix and neither develops color. The modified polyurethane does not develop color, nor does it cause phase separation or precipitation of components. The resulting transmittance decreases. In particular, the polyurethane film prepared by the present invention also has high dielectric properties on the basis of transparency, which solves the problem of poor dielectric properties of existing transparent films. The lithium salt and ionic liquid effectively dispersed in the polymer matrix of the present invention A lot of microcapacitors are built, so the dielectric constant of the material is greatly improved. In addition, the preparation method of the polyurethane film has the characteristics of wide sources of raw materials, simple process, good product applicability and strong practicability.

The invention claimed is:

1. A method for preparing a transparent flexible polyurethane film, comprising the following steps:
   (1) mixing a hydroxyl-terminated polyalkylene carbonate diol, a diisocyanate compound, 2,2'-dithiodiethanol, dibutyltin dilaurate and a chloroalkane solvent, and then reacting at 40 to 60° C. for 0.5 to 3 h to obtain an isocyanate-terminated oligomer solution; and
   (2) adding a polyol cross-linking agent, a bistrifluoromethanesulfonimide lithium salt and a 1-ethyl-3-methylimidazole bistrifluoromethanesulfonimide salt to the isocyanate-terminated oligomer solution, reacting at 40 to 60° C. for 0.5 to 1.5 h, removing the chloroalkane solvent to obtain the transparent flexible polyurethane film.

2. The method according to claim 1, wherein the chloroalkane solvent is selected from the group consisting of dichloromethane, trichloromethane, and 1,2-dichloroethane; the diisocyanate compound is selected from the group consisting of isophorone diisocyanate, hexamethylene diisocyanate, and dicyclohexylmethane diisocyanate; the polyol crosslinking agent is selected from the group consisting of trimethylolpropane and triethanolamine; and a molecular weight of the hydroxyl-terminated polyalkylene carbonate diol is 2000.

3. The method according to claim 1, wherein a mass ratio of the hydroxyl-terminated polyalkylene carbonate diol, the diisocyanate compound, 2,2'-dithiodiethanol, dibutyltin dilaurate, the polyol crosslinking agent, the bistrifluoromethanesulfonimide lithium salt and the 1-ethyl-3-methylimidazole bistri-fluoromethanesulfonimide salt is 100:(50 to 105):(23 to 46):(0.01 to 0.03):(4 to 11):(10 to 40):(10 to 40).

4. A self-healing material with high dielectric constant comprising the transparent flexible polyurethane film prepared according to claim 1.

5. A method of healing damage to a self-healing material according to claim 4, comprising:
   fixing the transparent flexible polyurethane film with a fixture; and
   heating at 80 to 150° C. for 0.5 to 2 h to complete a self-healable process.

6. The method according to claim 5, wherein the transparent flexible polyurethane film damage includes a scratch or fracture before the self-healable process.

* * * * *